United States Patent
Tschirhart

(10) Patent No.: US 9,489,169 B2
(45) Date of Patent: Nov. 8, 2016

(54) METHOD OF SUBSTITUTING SONGS IN A PLAYLIST

(71) Applicant: VISTEON GLOBAL TECHNOLOGIES, INC., Van Buren Township, MI (US)

(72) Inventor: Michael Dean Tschirhart, Ann Arbor, MI (US)

(73) Assignee: VISTEON GLOBAL TECHNOLOGIES, INC., Van Buren Township, MI (US)

( * ) Notice: Subject to any disclaimer, the term of this patent is extended or adjusted under 35 U.S.C. 154(b) by 218 days.

(21) Appl. No.: 14/015,595

(22) Filed: Aug. 30, 2013

(65) Prior Publication Data
US 2015/0067506 A1 Mar. 5, 2015

(51) Int. Cl.
*G06F 3/048* (2013.01)
*G06F 3/16* (2006.01)
*G06F 3/0482* (2013.01)
*G11B 27/10* (2006.01)

(52) U.S. Cl.
CPC ............. *G06F 3/165* (2013.01); *G06F 3/0482* (2013.01); *G11B 27/105* (2013.01)

(58) Field of Classification Search
CPC ..................... G06F 17/30772; G06F 17/30053
See application file for complete search history.

(56) References Cited

U.S. PATENT DOCUMENTS

| | | | |
|---|---|---|---|
| 7,228,054 B2 | 6/2007 | Cowgill | |
| 7,827,479 B2 | 11/2010 | Kali | |
| 2006/0200413 A1 | 9/2006 | Kessel et al. | |
| 2007/0107010 A1* | 5/2007 | Jolna | G06Q 30/02 725/34 |
| 2008/0120609 A1 | 5/2008 | Gates et al. | |
| 2008/0134032 A1 | 6/2008 | Pirnack et al. | |
| 2008/0300702 A1* | 12/2008 | Gomez | G06F 17/30743 700/94 |
| 2011/0218983 A1* | 9/2011 | Chaney | G06F 17/30752 707/705 |
| 2012/0117042 A1* | 5/2012 | Durante | G11B 27/105 707/705 |
| 2013/0086474 A1* | 4/2013 | Oliver | G06F 17/30053 715/716 |
| 2013/0124533 A1* | 5/2013 | Yadav | G06F 17/30 707/748 |

* cited by examiner

Primary Examiner — Matthew Ell
Assistant Examiner — Mohamed Abou El Seoud
(74) Attorney, Agent, or Firm — Klintworth & Rozenblat IP LLC

(57) ABSTRACT

A method for playing an original playlist and for substituting alternate versions of the songs during playback is disclosed. The user can set the extent to which the number and type of alternate versions are substituted into the original playlist.

18 Claims, 4 Drawing Sheets

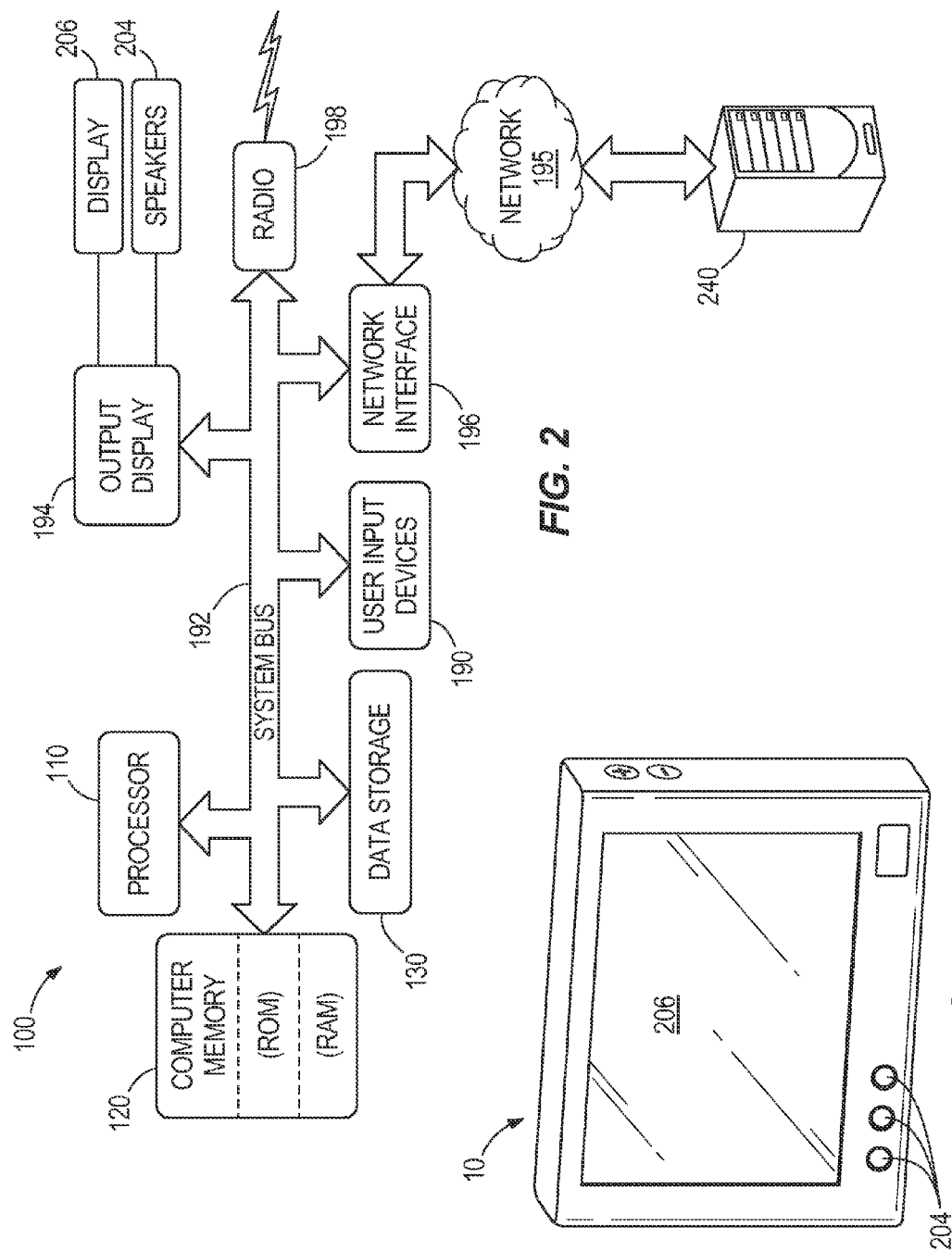

METHOD OF SUBSTITUTING SONGS IN A PLAYLIST

FIELD OF THE INVENTION

This invention relates to a method for playing an original playlist and for substituting alternate versions of the songs during playback, in order to improve user satisfaction.

BACKGROUND

Portable media playback devices, such as audio or video players, are commonly used to play music. A playlist is commonly used by users to playback desired media, defined herein as songs/musical pieces, on the media playback device. The user can select predefined tasks and with very few inputs select a list of media files to be played, increasing the playtime while decreasing the selection time. This list of media files to be played may be referred to as a play list.

Playlists are commonly created by a user in order to group songs together for playback. For example, a user may have a "work-out" playlist, a "relax" playlist, a playlist dedicated to a particular artist/band, etc. A user commonly manually creates a playlist and the song are played in the order of the playlist. Shuffling and other randomization schemes (including collaborative and analytic filtering) can be used to rearrange the order of the playlist.

Playlists get boring and stale from repetition. The user hears the same songs over and over again. This can lead to repetition fatigue by the user.

The present invention overcomes these issues and presents additional advantages which will become apparent upon a reading of the description herein.

SUMMARY OF THE INVENTION

A method for playing an original playlist and for substituting alternate versions of the songs during playback, is disclosed. The user can set the extent to which the number and type of alternate versions are substituted into the original playlist.

BRIEF DESCRIPTION OF THE DRAWINGS

The organization and manner of the structure and operation of the invention, together with further objects and advantages thereof may best be understood by reference to the following description, taken in connection with the accompanying drawings, wherein like reference numerals identity like elements in which:

FIG. 1 is a perspective view of a media player which incorporates the features of the present invention;

FIG. 2 is a block diagram of the media player;

DETAILED DESCRIPTION

Figure 3:
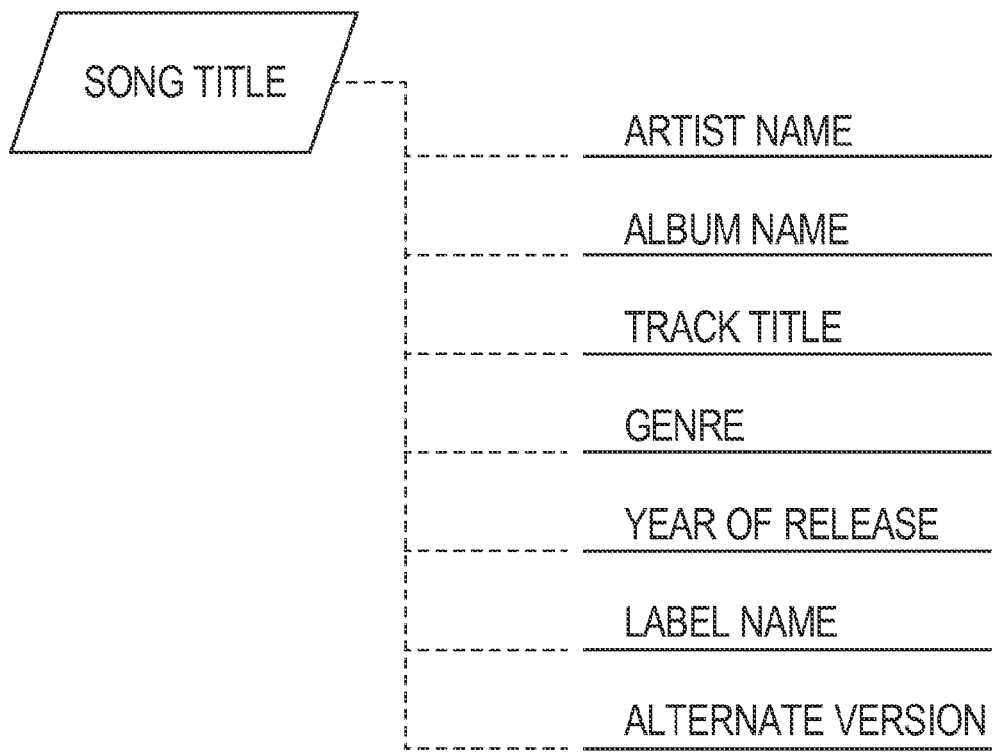
FIG. 3 shows fields relating to information about a song.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

A method for playing an original playlist and for substituting alternate versions of the songs during playback is provided. The method substitutes other versions of the song(s) in the original playlist, for example live, cover, remix, mash-up or other alternate takes of existing music, for those in the original playlist. For example, a "Rolling Stones" playlist substitutes a live version of a specific song, for example "Start Me Up", while preserving the underlying original playlist. This introduces variety in the playlist to provide increased satisfaction to the user over time.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

The present method can be implemented using a media player 10, an example of which is shown in FIG. 1, and a computer 100 within the media player 10, an example of which is shown in block diagram in FIG. 2. While a media player 10 having an internal data storage 130 is provided as a description of an implementation device for the method, it is to be understood that the data storage 130 (including, but not limited to the media collection and/or songs and/or playlists and/or alternative song instructions, lists or files) can reside on any combination of on-board/in-vehicle, nomadic device (e.g., phone or media player) and cloud. The media player 10 can be any device suitable for selecting and playback of media items to a user, for example including, but not limited to, MP3 players, personal computers, tablets, mobile telephones and personal digital assistants. A media collection is stored in data storage 130. The media player 10 can be placed in either a manual media selection mode or in an automatic media selection mode. When placed in manual media selection mode, a user selects a media item from the media collection and the media player 10 responsively plays back the user selected media item. When the media player 10 is placed in automatic media selection mode, the media player 10 selects a media item from the media, collection or library for playback.

The computer 100 runs a computer program containing computer-readable instructions. The computer 100 includes a processor 110 in communication with a computer readable memory medium 120. Computer readable memory medium 120 is any medium which can be used to store information which can later be accessed by processor 110. Computer memory 120 is preferably a fast-access memory and is used to run program instructions executable by the processor 110. The computer readable memory medium 120 includes data storage 130 which is used to store any information or computer program which may be accessed by the processor 110, such as an operating system, computer programs, program modules, and program data. Data storage 130 provides storage of computer readable instructions, data structures, program modules and other data for the computer 100. Data storage 130 include magnetic medium like a floppy disk, a hard disk drive, and magnetic tape; an optical medium like a Compact Disc (CD), a Digital Video Disk (DVD), and a Blu-ray Disc; and solid state memory such as random access memory (RAM), flash memory, and read only memory (ROM).

Computer 100 further includes input devices 190 through which data may enter the computer 100, either automatically or by a user who enters commands and data. The input devices 190 can be connected to processor 110 through a user input interface that is coupled to a system bus 192, but may be connected by other interface and bus structures, such as a parallel port, game port or a universal serial bus (USB). The computer 100 includes output devices 194, such as speakers 204 and/or a display 206. Alternatively or in addition to, the output devices 194 may be connected through an output peripheral interface 194 and the like.

Computer 100 also includes a radio 198 or other type of communications device for wirelessly transmitting and receiving data for the computer 100 with the aid of an antenna. Radio 198 may wirelessly transmit and receive data using WiMAX™, 802.11a/b/g/n, Bluetooth™, 2G, 2.5G, 3G, and 4G, wireless standards.

Computer 100 may operate in a networked environment using logical connections to one or more remote computers, such as remote server 240, via a network interface 196. The remote server 240 may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, remote computer may comprise the source machine from which data is being migrated, and the computer 100 may comprise the destination machine. Note, however, that source and destination machines need not be connected by a network or any other means, but instead, data, may be migrated via any media capable of being written by the source platform and read by the destination platform or platforms. When used in a LAN or WLAN networking environment, computer 100 is connected to the LAN or WLAN through a communications device 208 or an adapter. When used in a WAN networking environment, computer 100 may include a modem or other means for establishing communications over the WAN, such as radio 198, to environments such as the Internet or to another remote computer. It will be appreciated that other means of establishing a communications link between computer 100 and other remote computers may be used.

Display 206 can use any of a variety of types of display technologies, such as a liquid crystal display (LCD), a cathode-ray tube type display, an electronic ink display, a light emitting diode (LED) type display such as an OLED display, and a plasma display.

The network interface 196 is connected with the processor 110 and is capable of sending and receiving information between one or more other computers connected with the media player 10. Preferably, network interface 196 is capable of wirelessly transmitting signals to another computer, such as remote server 240, using a radio transmitter and a radio receiver connected with an antenna.

Network 195 may include any type of network that is capable of sending and receiving communication signals, including signals for multimedia content, images, data and streaming video. Network 195 may include a data network, such as the Internet, an intranet, a local area network (LAN), a wide area network (WAN), a cable network, and other like systems that, are capable of transmitting information, such as digital data, and the like. Network 195 may also include a telecommunications network, such as a local telephone network, long distance telephone network, cellular telephone network, satellite communications network, cable television network and other like communications systems that interact with computer systems to enable transmission of information between media player 10 and another computer such as remote server 240. Network 195 may include more than one network and may include a plurality of different types of networks. Thus, network 195 may include a plurality of data networks, a plurality of telecommunications networks, cable systems, satellite systems and/or a combination of data and telecommunications networks and other like communication systems.

Network 195 is connected with both media player 10 and remote server 240 and allows for information to be transmitted and shared between media player 10 and remote server 240. Remote server 240 includes any type of computer which can receive, store, process, and transmit information to another computer and includes devices such as a server based computer system capable of interacting with one or more other computer systems.

The media content files and information associated with the media items, are stored in the data storage 130 (which as discussed above can reside on any combination of on-board/in-vehicle, nomadic device (e.g., phone or media player) and cloud), and the processor 110 receives user inputs, provides information to the user through the output devices 194 and accesses the files and information according to the user inputs. New media items may be added to the media content files and information associated with the media items in the data storage 130, and existing media content files and information associated with the media items may be removed from the data storage 130.

With the present method, the user defines a playlist comprised of a plurality of songs. Each song has information stored in a resource containing song metadata (for example, a remote database such as GRACENOTE® database or a database like the GRACENOTE® database) relating to the song. When the song is downloaded into the data storage 130, the information in the remote database is also downloaded into the data storage 130 and can be accessed by the computer program of the media player 10. Such information is broken into fields and can include the following: Artist name; Album name; Track title; Genre; Year of release; Label name; Alternate version to another song (song(s) listed in this field(s)).

When the song is downloaded into the data storage 130, the computer-readable instructions may be programmed to be able to search the data storage 130 to determine if there are any alternate versions of the song stored in the data storage 130. If such an alternate version of the song is found, the Alternate version field is filled in by the computer-readable instructions, or the computer-readable instructions prompts the user to confirm that this found version is an alternate version of the existing song and then the Alternate version field is filled in by the computer-readable instructions. To find the alternate version, the computer-readable instructions may be programmed to compare the titles of the songs and if there is a substantial similarity in the titles, the computer-readable instructions may be programmed to prompt the user to confirm that the found song is an alternate version or may be programmed to assume that the song is an alternate version. With a "live" version of the song, the song usually has the title of the song with (live version) in parenthesis after the title. The computer-readable instructions are then programmed to recognize that this an alternate version of the song. Alternately or in addition, if some or all of the information is not available from the remote database when the song is downloaded, the computer-readable instructions of the media player 10 may be programmed to prompt the user to manually enter this information into the appropriate field. If this information is not known by the user, then the user can skip this prompt (and the computer-readable instructions may be programmed to search the data storage 130 as discussed herein).

When the song is downloaded into the data storage 130, the computer-readable instructions may be programmed to be able to search for an alternate version of the song in the database of the remote server 240 and thereafter, prompt the user to download the alternate version of the song. The computer-readable instructions may be programmed to search the database of the remote server 240 based upon title, or if the database of the remote server 240 has the Alternate version field provided and filled in its database, then the computer-readable instructions may be programmed to search this field. Once downloaded, the appropriate field (if not already provided by the supplying database) is filled in to mark that the new song is an alternate version. This can encourage users to purchase additional songs.

With the present method, the user sets a setting that at a predetermined interval, the media player 10 plays an alternate version of some or all of the songs (provided such an alternate version is stored in the data storage 130). That is, the user can set the extent to which the number and type of alternate versions are substituted into the original playlist. The predetermined interval is programmed into the media player 10 by the user configuring the settings in the processor 110. This may be set by the user setting the setting such that the computer-readable instructions plays an alternate version every X-number of times the playlist is played, for example every third time the playlist is played. Alternatively, this can be set by the user sliding his/her finger along a slider bar on the user interface display 206 from low to high, with low meaning that alternate versions are not substituted in very often, and with high meaning that alternate versions are substituted in frequently. In addition, the computer-readable instructions may be programmed to prompt the user to select whether particular songs or all of the songs are to have the alternate version played, and which alternate version(s) is/are to be played (if the data storage 130 contains more than one alternate version).

Figure 4:
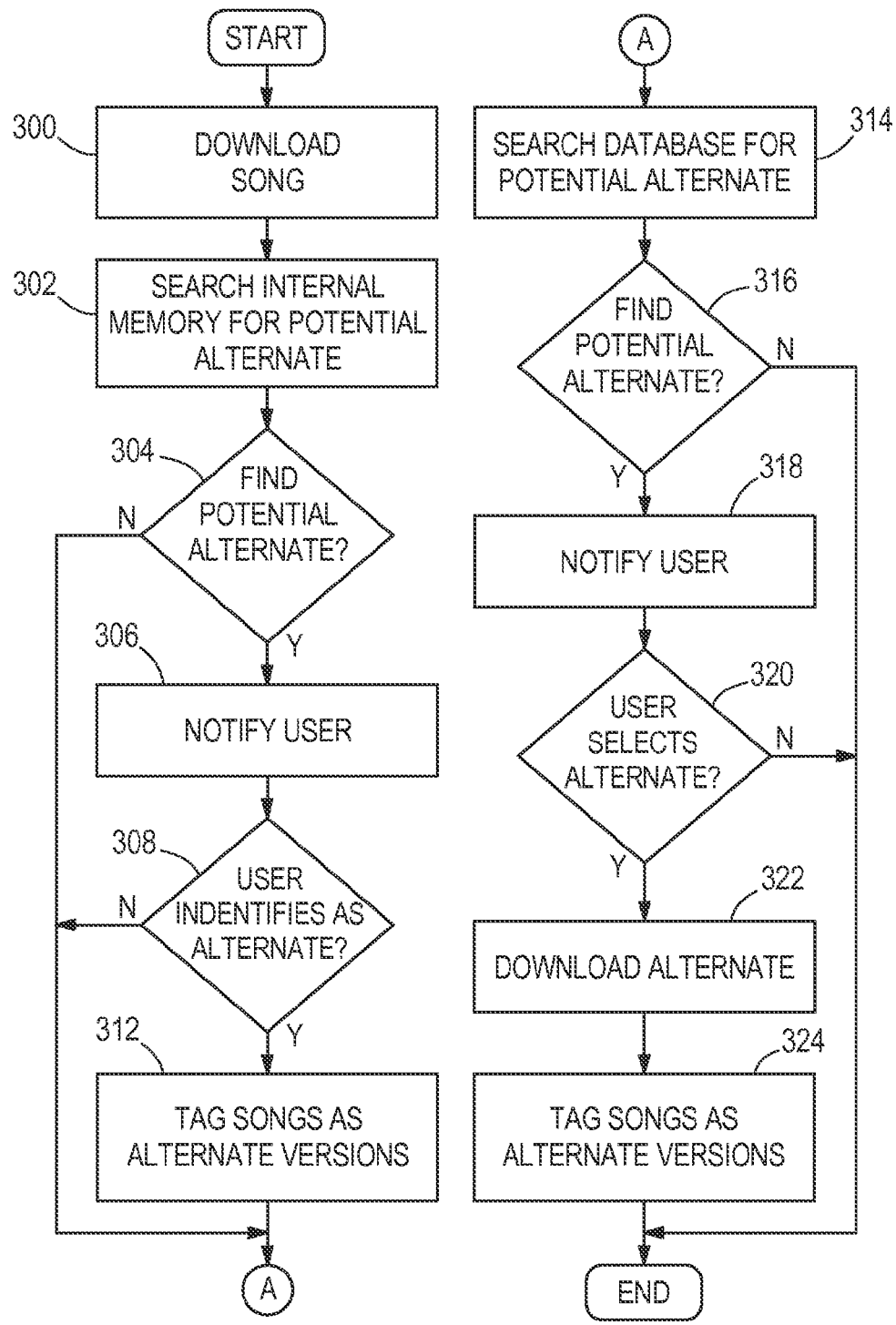
FIG. 4 is a flowchart, illustrating the method of downloading a song to the media, player.

FIG. 4 shows the steps that may be taken when a song is downloaded to the media player 10. In step 300, a song is downloaded into the data storage 130. At step 302, the memory 120 is searched for a potential alternate version. If a potential alternate version is found at step 304, then at step 306 the user is notified via the speakers 204 or the display 206. The user is asked to identify the potential alternate version as a correct alternate version at step 308. If yes, then at step 310, the potential alternate version is identified as an Alternate version at step 312 (the field is filled in).

At steps 304 and 308, if the answer is no to either step, the method may be programmed to be advanced to step 314. In step 314, the database of the remote server 240 is accessed by the media player 10 and the database of the remote server 240 is searched for potential alternate version(s). If a potential alternate version is found at step 316, then at step 318 the user is notified via the speakers 204 or the display 206. The user is asked to identify the potential alternate version(s) as alternate versions at step 320. If yes, then the alternate version is downloaded to the media player 10 at step 322 and the alternate version is identified as an Alternate version at step 324 (the field is filled in).

The above steps are repeated for each song newly downloaded to the media player.

Figure 5:
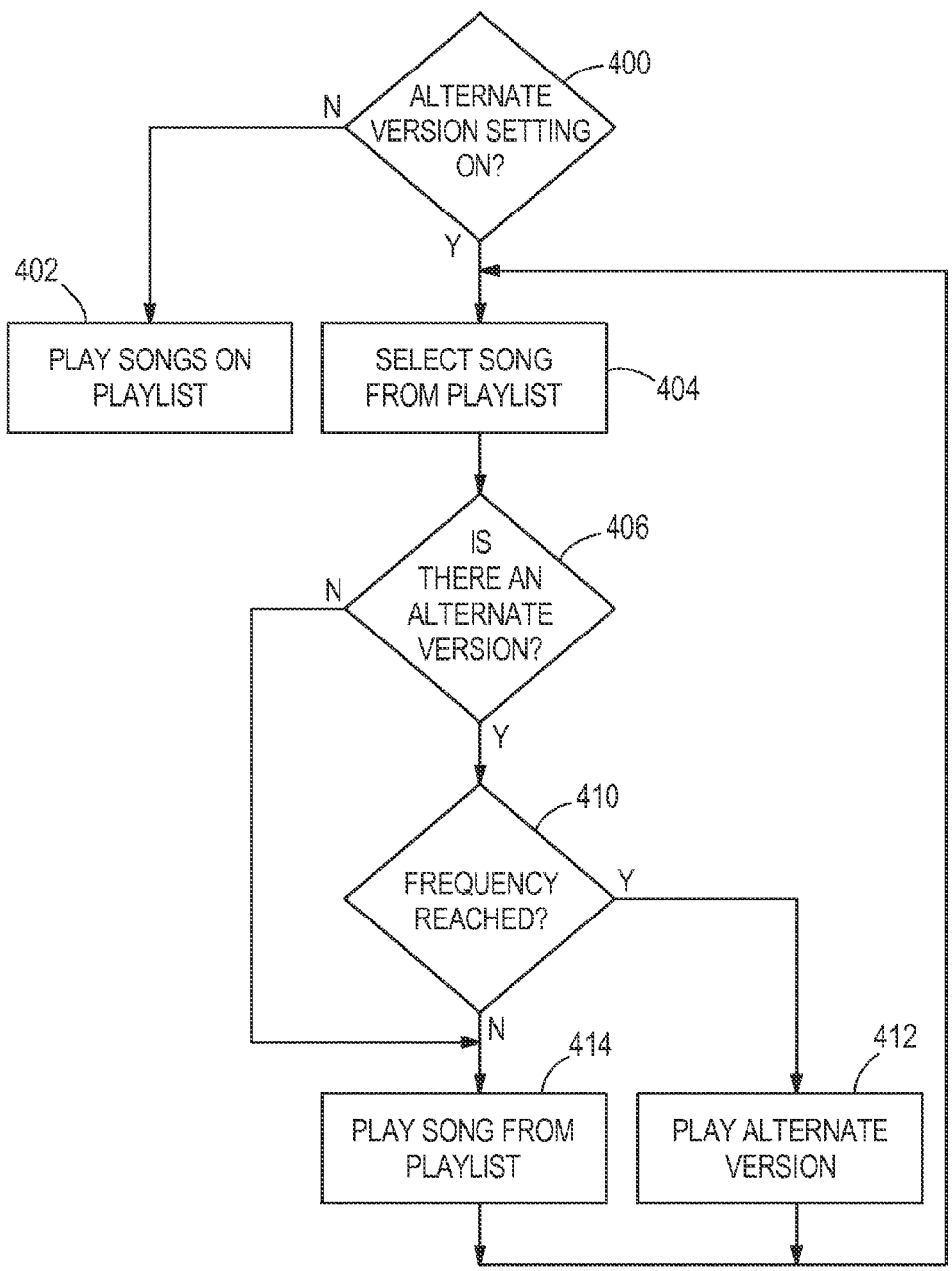
FIG. 5 is a flowchart illustrating the method used to playback songs.

FIG. 5 shows a Mode diagram of the steps that are taken to play the alternate version(s) of the song(s) during the playback of the playlist. At step 400, the computer-readable instructions determine if alternate version(s) is/are to be substituted into the playlist. If no, the original playlist is played at step 402. If yes, a song is selected from the playlist at step 404, the computer-readable instructions determine if there is an alternate version of the song at step 406. If yes, the computer-readable instructions determine at steps 410 if this is one of the times that the alternate version is to be played. If yes to step 410, the alternate version is played at step 412. If no to step 410, the version from the original playlist is played at step 414. This is repeated for each song in the playlist.

As a result of this method, the underlying original playlist (the playlist without alternate version(s)) is preserved, while variety is introduced in the playlist at predetermined intervals (by playing the alternate versions at these predetermined intervals) to provide increased satisfaction to the user over time. This adds entertainment value to an existing playlist from the user perspective and offers another means to add value from the content provider perspective through the incremental sales of additional alternate song versions.

It is to be recognized that various alterations, modifications, and/or additions may be introduced into the constructions and arrangements of parts described above without departing from the spirit or scope of the present invention, as defined by the appended claims.

The invention claimed is:

1. A method in an audio media player having a memory, wherein the memory includes a playlist of original audio songs, the method comprising the steps of:
   adding a new song to the playlist in memory;
   determining if the new song is an alternate version corresponding to a selected song of the plurality of original audio songs in the playlist, by comparing a title of the new song with a title of the selected song to establish a level of similarity;
   if the established level of similarity is sufficient, prompting a user to confirm that the new song is an alternate version of the selected song, and if confirmed:
   marking an alternate version field of the new song to indicate that the new song is an alternate version of the selected song; and
   linking the new song to the selected song in the playlist;
   setting an alternative version play mode to either an ON condition or an OFF condition,
   wherein when the mode is set to the ON condition, an alternative version of a song in the playlist may be substituted for the selected song to be played so as to add variety to the playlist; and
   wherein when the mode is set to the OFF condition, an alternative version of a song in the playlist is not played so as to preserve the playlist without alternative versions;

setting, by the user, an interval requirement that determines when an alternate version of a song must be played; and selecting an audio song to be played from the playlist, and if the alternative version play mode is set to the ON condition, then playing an alternate version of the selected song when it is determined that the interval requirement is met.

2. The method of claim 1, wherein before the step of determining whether an alternate version of the song is stored in the memory, the step of determining whether an alternate version of the song is to be played is performed.

3. The method of claim 2, wherein if it is determined that an alternate version of the song is not to be played, then playing the song in the playlist.

4. The method of claim 2, wherein a user sets an interval requirement as to how often the alternate version of the song is to be played, and further comprising the steps of determining whether an interval requirement is met; and when it is determined that the interval requirement is met, playing the alternate version of the song.

5. A method in an audio media player having a memory, wherein the memory includes a plurality of original audio songs, the method comprising the steps of:
adding a new song to the memory;
determining whether the new song is an alternate version of a selected song of the plurality of original songs stored in the memory, by comparing a title of the new song with a title of the selected song to establish a level of similarity;
when it is determined that the level of similarity is sufficient, prompting a user to confirm the new song is an alternate version of the selected song, and if confirmed, then marking an alternate version field in the new song to indicate that the new song is an alternate version of the selected song and linking the new song to the selected song;
setting an alternative version play mode to either an ON condition or an OFF condition, wherein when the mode is set to the ON condition, an alternative version of a song may be substituted for the selected song to be played so as to add variety, and when the mode is set to the OFF condition, an alternative version of a song is not played so as to preserve the original songs in memory without alternative versions;
setting, but the user, an interval requirement that determines when an alternate version of the song must be played;
selecting an audio song to be played, and if the alternative version play mode is set to the ON condition, then playing an alternate version of the selected song when it is determined that the interval requirement is met.

6. The method of claim 5, wherein when it is determined that an alternate version of the song is not stored in the memory, accessing a remote database to find an alternate version of the new song and prompting the user as to whether the alternate version is to be added to the memory.

7. The method of claim 6, wherein if the alternate version is added to the memory, linking the alternate version to the new song.

8. The method of claim 5, further including prompting a user to confirm that the alternate version is an alternate of the new song.

9. The method of claim 5, wherein when a new song is added to the memory, prompting a user to fill in data relating to the song.

10. A non-transitory computer-readable medium containing instructions for controlling an audio processing unit to perform a method, the method comprising the steps of:
adding a new song to a playlist in memory;
determining if the new song is an alternate version corresponding to a selected song of a plurality of songs in the playlist, by comparing a title of the new song with a title of the selected song to establish a level of similarity;
if the established level of similarity is sufficient, prompting a user to confirm that the new song is an alternate version of the selected song, and if confirmed then marking an alternate version field of the new song to indicate that the new song is an alternate version of the selected song; and linking the new song to the selected song in the playlist;
setting an alternative version play mode to either an ON condition or an OFF condition, wherein when the mode is set to the ON condition, an alternative version of a song in the playlist may be substituted for the selected song to be played so as to add variety to the playlist, and when the mode is set to the OFF condition, an alternative version of a song is not played so as to preserve the playlist without alternative versions;
setting, by the user, an interval requirement that determines when an alternate version of the song must be played; and
selecting an audio song to be played from the playlist, and if the alternative version play mode is set to the ON condition, then playing the alternate version of the selected song when it is determined that the interval requirement is met.

11. The non-transitory computer-readable medium containing instructions for controlling a processing unit to perform the method of claim 10, wherein before the step of determining whether an alternate version of the song is stored in the memory, the step of determining whether an alternate version of the song is to be played is performed.

12. The non-transitory computer-readable medium containing instructions for controlling a processing unit to perform the method of claim 11, wherein if it is determined that an alternate version of the song is not to be played, then playing the song in the playlist.

13. The non-transitory computer-readable medium containing instructions for controlling a processing unit to perform the method of claim 11, wherein a user sets an interval requirement as to how often the alternate version of the song is to be played, and further comprising the steps of determining whether an interval requirement is met; and when it is determined that the interval requirement is met, playing the alternate version of the song.

14. A non-transitory computer-readable medium containing instructions for controlling an audio processing unit to perform a method, the method comprising the steps of:
adding a new song to a playlist in a memory;
determining whether a new song is an alternate version corresponding to a selected song stored in the playlist by comparing a title of the new song with a title of the selected song to establish a level of similarity; if the established level of similarity is sufficient, prompting a user to confirm that the new song is an alternate version of the selected song, and if confirmed, marking an alternate version field of the new song to indicate that the new song is an alternate version of the selected song and linking the new song to the selected song in the playlist;

setting an alternative version play mode to either an ON condition or an OFF condition, wherein when the mode is set to the ON condition, an alternative version of a song in the playlist may be substituted for the selected song to be played so as to add variety to the playlist, and wherein when the mode is set to the OFF condition, an alternative version of a song in the playlist is not played so as to preserve the playlist without alternative versions; and setting, by the user, an interval requirement that determines when an alternate version of the song must be played, and selecting an audio song to be played from the playlist, and if the alternative version play mode is set to the ON condition, then playing the alternate version of the selected song when it is determined that the interval requirement is met.

15. The non-transitory computer-readable medium containing instructions for controlling a processing unit to perform the method of claim 14, wherein when it is determined that an alternate version of the song is not stored in the memory, accessing a remote database to find an alternate version of the new song and prompting the user as to whether the alternate version is to be added to the memory.

16. The non-transitory computer-readable medium containing instructions for controlling a processing unit to perform the method of claim 15, wherein if the alternate version is added to the memory, linking the alternate version to the new song.

17. The non-transitory computer-readable medium containing instructions for controlling a processing unit to perform the method of claim 14, further including prompting a user to confirm that the alternate version is an alternate of the new song.

18. The non-transitory computer-readable medium containing instructions for controlling a processing unit to perform the method of claim 14, wherein when a new song is added to the memory, prompting a user to fill in data relating to the song.

* * * * *